J. F. LINCOLN.
ARC WELDER APPARATUS.
APPLICATION FILED OCT. 30, 1918.

1,329,532.  Patented Feb. 3, 1920.

James F. Lincoln
Inventor

By Geo E Kirk
Attorney

UNITED STATES PATENT OFFICE.

JAMES F. LINCOLN, OF CLEVELAND, OHIO, ASSIGNOR TO THE LINCOLN ELECTRIC COMPANY, OF CLEVELAND, OHIO, A CORPORATION OF OHIO.

ARC-WELDER APPARATUS.

1,329,532.  Specification of Letters Patent.  Patented Feb. 3, 1920.

Application filed October 30, 1918. Serial No. 260,241.

*To all whom it may concern:*

Be it known that I, JAMES F. LINCOLN, a citizen of the United States of America, residing at Cleveland, Cuyahoga county, Ohio, have invented a new and useful Arc-Welder Apparatus, of which the following is a specification.

This invention relates to electric arc direct current welding apparatus.

This invention has utility when incorporated in connection with the working of metals, particularly in making joints and in the repairing of sheet and cast metals, being of simple form for directly operating from alternating current supply.

Referring to the drawings.

Figure 1:
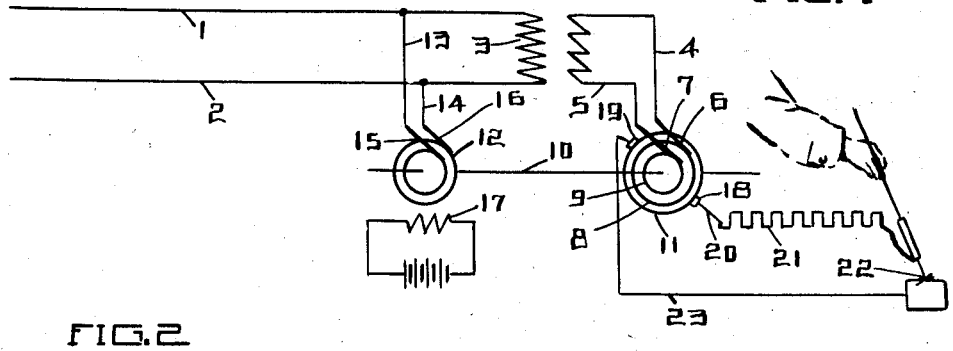
Figure 1 is a wiring diagram of an embodiment of the invention for arc welding apparatus hereunder.

The single phase electric current supply lines 1, 2 extend to the constant current transformer 3 having lines 4, 5, therefrom to brushes 6, 7, coacting with slip rings 8, 9, mounted on shaft 10 to rotate in unison with current rectifying commutator 11 as actuated in synchronism with the supply current by synchronous motor 12, as connected thereto by lines 13, 14, to brushes 15, 16, and further provided with the separately excited winding 17.

The commutator 11 has brushes 18, 19, in circuit by line 20, reactance 21, welding arc 22 and line 23, this reactance or non-inductive resistance 21 being of sufficient extent for modifying the continuous current so that the fluctuations thereof are so smoothed out to approximate uniformity within the range of practical direct current arc maintenance in useful work operations.

The almost negligible load upon the synchronous motor and the small sizes thereof which may be conveniently adopted, mean that this installation may have electrical and mechanical efficiency of ample range of capacity with a minimum of apparatus for initial acquisition and upkeep.

Figure 3:
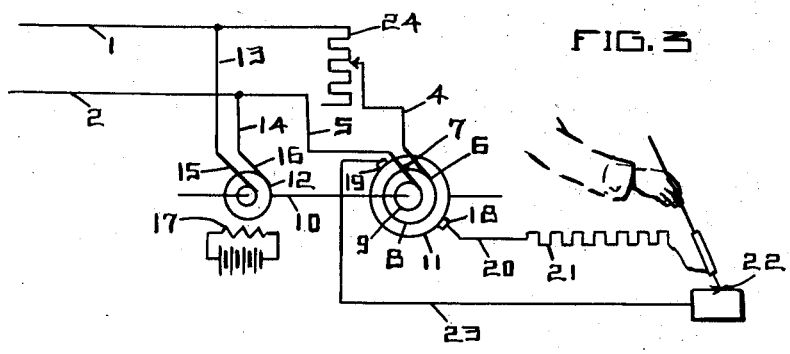
Fig. 3 is a wiring diagram of a reactance modified single phase apparatus, instead of transformer modified, as shown in Fig. 1.
Figure 4:
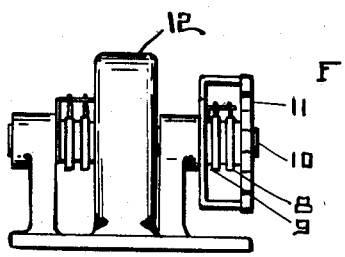
Fig. 4 is a view of commutator rectifier and single phase of synchronous motor combined.

The pulling down of the voltage may occur with the desired transformer shown in Fig. 1 as of constant current type, or it may be brought about by a variable reactance 24 (Fig. 3), which may be mechanically adjusted to suit the desired operating conditions.

In the apparatus of this disclosure, the generated current of the supply is the current used at the arc, as modified by the electrical potential devices of transformer or reactance. This same generated supply current as so modified, is mechanically rectified, and then ironed out to such uniformity as to render efficient and convenient arc maintenance.

The apparatus is electrically and mechanically efficient to a high degree, for there is no regeneration electrical loss, but only the line resistances, and the mechanical friction is insignificant as involving only the brushes and single no load carrying rotor. The unit of commutator rectifier, motor and potential modifier, whether reactance or transformer, comprises a simple and light equipment for attaining practical results at a low cost.

Figure 2:
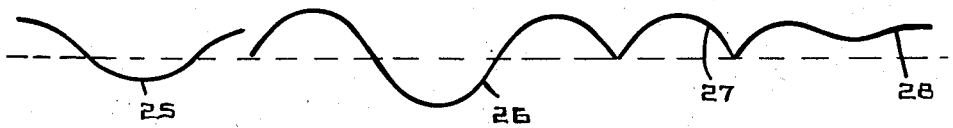
Fig. 2 is a curve of the modified single phase electric current supply.

The curve 25, Fig. 2, may be taken as illustrative of a cycle of the alternating current from the supply lines 1, 2, which if of 110 volts, in merging toward 70 or 80 volts, would show the slight increase of current for the curve 26 from the transformer, while the commutator may adjust this current to the continuous one of curve 27, the range of fluctuation in which is smoothed out by the reactance 21, to bring into uniformity of the curve 28 for the arc consumption.

What is claimed and it is desired to secure by Letters Patent is:

1. An arc welder apparatus embodying an alternating electric current supply, potential reducing means therefor, a rectifier for said potential reduced current, a reactance for the rectified current, and an arc directly using reactance modified, rectified potential reduced current.

2. An arc welder apparatus embodying an alternating electric current single phase supply, a transformer for said supply, a commutator rectifier for the transformed current, a synchronous motor for the rectifier, and an arc and reactance in circuit from the rectifier.

3. An arc welder apparatus embodying an alternating current supply, a commutator rectifier and a synchronous motor connected to the supply, said motor actuating the rectifier, and a circuit from the rectifier including an arc and a reactance.

4. The method of maintaining a continuous arc from an alternating current supply of single phase, comprising rectifying thereof and introducing non-inductive resistance in said rectified current to provide a circuit for an arc.

5. A single phase alternating electric supply circuit, a step down transformer and a synchronous motor connected thereto, a commutator rectifier actuable by the motor and supplied from the transformer, and a circuit from the rectifier including an arc and a non-inductive resistance.

In witness whereof I affix my signature.

JAMES F. LINCOLN.